(12) United States Patent
Matulis et al.

(10) Patent No.: US 9,398,564 B2
(45) Date of Patent: Jul. 19, 2016

(54) CHANNEL SELECTION IN A WIRELESS NETWORK

(75) Inventors: Gary Matulis, Chester, NH (US); Magued Barsoum, Framingham, MA (US); Owais Hassan, Andover, MA (US); John Pacheco, Merrimack, NH (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 710 days.

(21) Appl. No.: 13/404,693

(22) Filed: Feb. 24, 2012

(65) Prior Publication Data

US 2012/0225683 A1 Sep. 6, 2012

Related U.S. Application Data

(60) Provisional application No. 61/447,730, filed on Mar. 1, 2011.

(51) Int. Cl.
*H04W 72/00* (2009.01)
*H04W 72/04* (2009.01)
*H04W 84/18* (2009.01)
*H04W 24/02* (2009.01)

(52) U.S. Cl.
CPC .............. *H04W 72/04* (2013.01); *H04W 24/02* (2013.01); *H04W 84/18* (2013.01)

(58) Field of Classification Search
CPC ...................................................... H04W 24/02
USPC ........................ 455/509, 524, 450, 525, 452.2
See application file for complete search history.

(56) References Cited

U.S. PATENT DOCUMENTS

| 8,363,693 | B2 * | 1/2013 | Fujiwara | 375/131 |
| 8,374,140 | B2 * | 2/2013 | Hu | 370/329 |
| 2009/0252134 | A1 * | 10/2009 | Schlicht et al. | 370/338 |
| 2010/0232372 | A1 * | 9/2010 | Jakllari et al. | 370/329 |
| 2012/0225683 | A1 * | 9/2012 | Matulis et al. | 455/509 |

* cited by examiner

*Primary Examiner* — Sanh Phu
(74) *Attorney, Agent, or Firm* — Ingrassia, Fisher & Lorenz, PC

(57) ABSTRACT

Systems and methods are described for managing channel selection among a plurality of mesh points in a wireless network. In one embodiment, a method includes receiving a first announcement that includes channel exclusion information from a first mesh point; managing a distributed channel exclusion list based on the announcement; and generating a second announcement to the first mesh point based on the channel exclusion list.

19 Claims, 5 Drawing Sheets

| ID | Length | OUI | Version | Type | Subtype | Reg Class 1 | CH 1 | Distance | ... | Reg Class N | CH N | Distance |

FIG. 2

CHANNEL SELECTION IN A WIRELESS NETWORK

CROSS-REFERENCES TO RELATED APPLICATIONS

This patent application claims priority to U.S. Provisional Patent Application Ser. No. 61/447,730 filed Mar. 1, 2011 which is incorporated herein by reference in its entirety.

TECHNICAL FIELD

The present disclosure generally relates to methods and systems for communicating in a wireless network, and more particularly to methods and systems for selecting a channel in a wireless network.

BACKGROUND

A wireless network includes at least two network nodes sending and receiving data therebetween on a certain wireless channel. One such wireless network is a mobile mesh network that may or may not be connected to a network outside of the mesh network. Typically, the mesh network will include many more than two nodes, referred to as mesh points, which may be spread out over a large area. The mesh network is not necessarily fully connected. In general, mesh points in the network communicate over a single channel or some subset of available channels. In order to maintain all communicating mesh points on the same channel or subset of channels, the operator selects a channel and configures all mesh points with the same channel.

In typical network scenarios, some channels are less desirable for a number of reasons such as interference, signal quality, or the presence or susceptibility to radar interference. Some mesh points perform dynamic frequency selection where the presence of radar on a particular frequency is detected and a different frequency is chosen. The new frequency may be elected based on a tie-breaking method where the elected channel may not necessarily be the best channel, but is one that was chosen through an arbitrary or sub-optimal process.

As a result, it is desirable to provide a mechanism for mesh points to select a new channel based on known excluded channels in the network. Other desirable features and characteristics will become apparent from the subsequent detailed description and the appended claims, taken in conjunction with the accompanying drawings and this background of the invention.

BRIEF SUMMARY

According to various exemplary embodiments, systems and methods are described for managing channel selection among a plurality of mesh points in a wireless network. In one embodiment, a method includes receiving a first announcement that includes channel exclusion information from a first mesh point; managing a distributed channel exclusion list based on the announcement; and generating a second announcement to the first mesh point based on the channel exclusion list.

Other embodiments, features and details are set forth in additional detail below.

BRIEF DESCRIPTION OF THE DRAWINGS

The present invention will hereinafter be described in conjunction with the following drawing figures, wherein like numerals denote like elements.

FIG. 2 is a block diagram illustrating data of a channel exclusion announcement that is processed by the channel management system in accordance with exemplary embodiments;

DETAILED DESCRIPTION

The following detailed description of the invention is merely example in nature and is not intended to limit the invention or the application and uses of the invention. Furthermore, there is no intention to be bound by any theory presented in the preceding background or the following detailed description. As used herein, the term "module" refers to any hardware, software, firmware, electronic control component, processing logic, and/or processor device, individually or in any combination, including, without limitation: an application specific integrated circuit (ASIC), an electronic circuit, a processor (shared, dedicated, or group) and memory that executes one or more software or firmware programs, a combinational logic circuit, and/or other suitable components that provide the described functionality.

Turning now to the figures and with initial reference to FIG. 1, an exemplary wireless communication system for providing communications between one or more nodes or mesh points (hereinafter referred to as mesh points) is shown to include a channel management system in accordance with exemplary embodiments. Although the figures shown herein depict an example with certain arrangements of elements, additional intervening elements, devices, features, or components may be present in actual embodiments. It should also be understood that FIG. 1 is merely illustrative and may not be drawn to scale.

Figure 1:
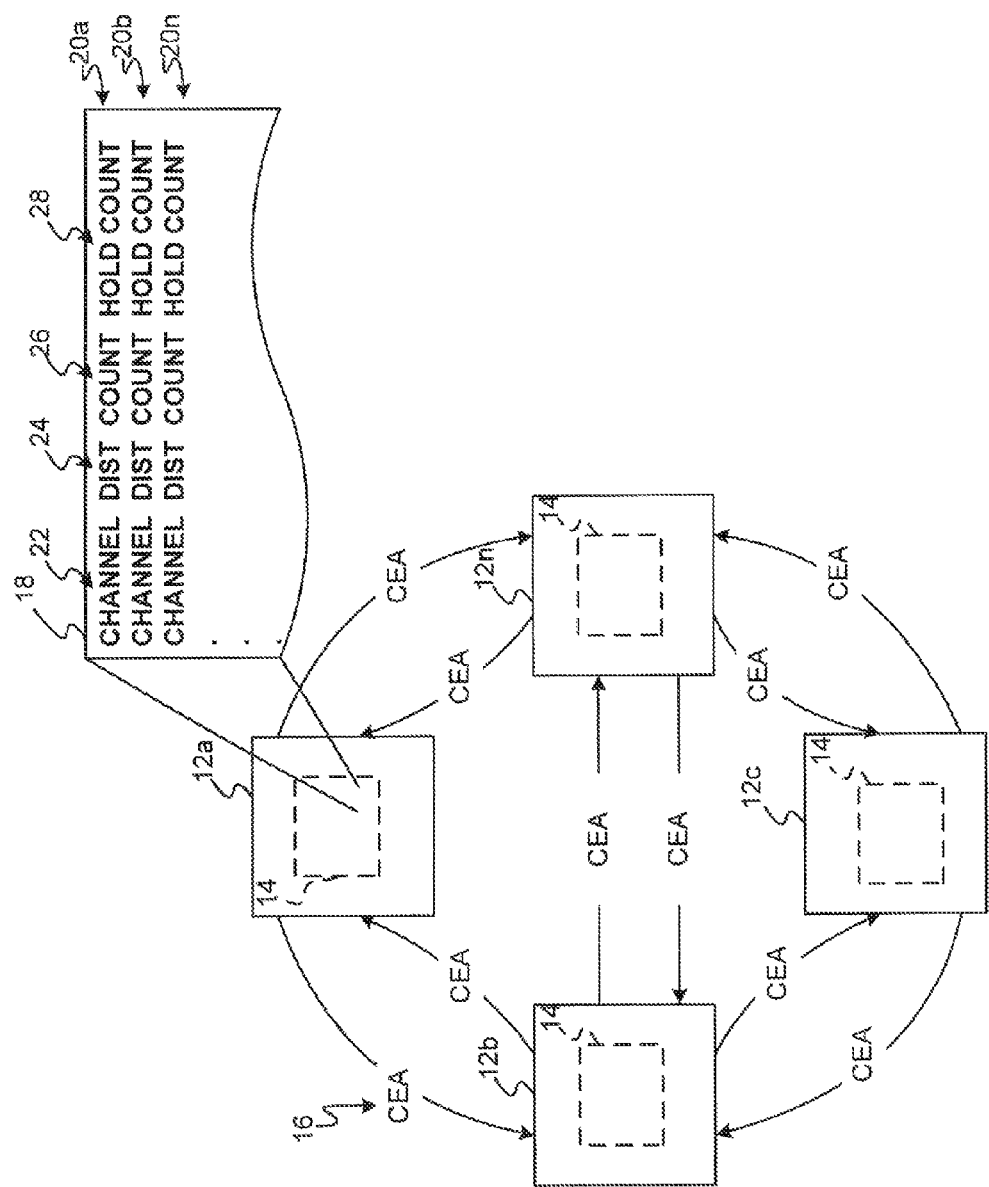
FIG. 1 is a block diagram of an exemplary wireless communication system that includes a channel management system in accordance with exemplary embodiments.

In the example shown in FIG. 1, an exemplary wireless network 10 is shown to include a plurality of mesh points 12a-12n. The mesh points 12a-12n communicate over a particular channel (e.g., channel 100) or a subset of channels. In the wireless network topology shown, mesh point 12a can communicate with mesh point 12b and mesh point 12n. Mesh point 12b can communicate with mesh point 12a, mesh point 12c, and mesh point 12n. Mesh point 12c can communicate with mesh point 12b, and mesh point 12n. Mesh point 12n can communicate with mesh point 12b and mesh point 12c. Mesh point 12a cannot communicate directly with mesh point 12c however, can communicate indirectly through mesh point 12b or mesh point 12n.

Each mesh point 12a-12n includes a channel manager module 14 that sends information about excluded channels learned locally and excluded channels learned from other mesh points 12a-12n in the form of a channel exclusion announcement (CEA) 16. The CEAs 16 may be exchanged as part of a beacon or other period messages sent by the mesh point 12a-12n. The CEAs 16 may include information such as, but not limited to, a regulatory class of the excluded channels, the excluded channels, and a distance from the originator of the exclusion for each excluded channel.

FIG. 2 illustrates one embodiment of the CEA 16, with each field described in Table 1 below.

TABLE 1

| Field | Description |
|---|---|
| ID | Vendor Proprietary IE ID |
| Length | Length in bytes |
| OUI | Organizational Unique Identifier |
| Version | IE Version |
| Type | IE Type |
| Subtype | IE Subtype |
| Reg Class 1 . . . N | The regulatory class of the excluded channel |
| CH 1 . . . N | The excluded channel |
| Distance | Distance, in hops, from the originator of the exclusion entry |

With reference back to FIG. 1, from the CEAs 16, the channel manager module 14 maintains a global exclusion list 18 of invalid channels. The channel may be considered invalid because radar was detected on the channel, or operator configuration specifies a channel is not to be used. The exclusion list 18 includes one or more entries 20a-20n (e.g., one for each excluded channel). Each entry 20a-20n includes fields 22-28. Each field 22-28 stores information for a particular excluded channel. The fields include, for example, but are not limited to, an excluded channel 22, a distance 24, a count 26 or other timing mechanism, and a hold count 28 or other timing mechanism.

The distance 24 is used to prevent a given excluded channel from being endlessly propagated throughout the wireless network 10. For example, the distance 24 of an originator of the exclusion is set to zero. At each hop, the distance 24 is incremented. If the distance 24 for the excluded channel is greater than the distance 24 stored in the exclusion list 18 for that excluded channel, the excluded channel is ignored.

The count 26 is used to remove excluded channels from the exclusion list 18 after an event has occurred. For example, the count 26 may be used as an aging mechanism to ensure that entries corresponding to radar events are removed after X time has passed; and/or to ensure entries corresponding to a mesh points 12a-12n with a statically configured excluded channel are removed from the exclusion list 18 when the mesh point 12a-12n leaves the wireless network 10. The hold count 28 is used to allow time for an excluded channel to be aged out of neighboring exclusion lists 18 of neighboring mesh points 12a-12n. For example, the hold count 28 may be used as an aging mechanism to hold the excluded channel in the list until Y time has passed.

Referring now to FIG. 2, and with continued reference to FIG. 1, a dataflow diagram illustrates various embodiments of the channel manager module 14 for the wireless network 10 that may be embedded within a mesh point 12a-12n. Various embodiments of channel manager modules 14 according to the present disclosure may include any number of sub-modules embedded within the mesh point 12a-12n. As can be appreciated, the sub-modules shown in FIG. 2 may be combined and/or further partitioned to similarly manage channel selection in the wireless network 10. In various embodiments, the channel manager module 14 includes a list manager module 30, a channel data communication module 32, and an exclusion list datastore 34.

The list manager module 30 receives as input one or more channel exclusion announcements 36a-36n. Based on the received channel exclusion announcements 36a-36n, the list manager module 30 generates exclusion data 38 and stores the exclusion data 38 as the channel exclusion list 18 in the exclusion list datastore 34. The exclusion data 38 includes the excluded channel 22, the distance 24, the count 26, and the hold count 28. The list manager module 30 sets the distance 24, the count 26, and the hold count 28 for each excluded channel 22 based on whether the excluded channel 22 is a new channel and based on the distance 24 provided in the received channel exclusion announcement 36a-36n.

For example, when the excluded channel 22 is a newly excluded channel, the exclusion data 38 is updated by setting the distance 24 to distance (from the channel exclusion announcement 36a-36n) plus one, setting the count 26 to X (e.g., thirty seconds); and setting the hold count 28 to Y (e.g., five minutes or 300 seconds). In another example, when the excluded channel 22 is not a newly excluded channel (e.g., is already included as an entry 20a-20n in the exclusion list 18) and the associated distance 24 from the received channel exclusion announcement 36a-36n is less than the stored distance 24 from the exclusion list 18, the exclusion list 18 is updated by keeping the distance 24 the same; setting the count 26 to Z (e.g., five seconds); and setting the hold count 28 to W (e.g., five minutes or 300 seconds). In yet another example, when the excluded channel 22 is not a newly excluded channel and the associated distance 24 from the channel exclusion announcement 36a-36n is greater than the stored distance 24 from the exclusion list 18, the exclusion data 38 is not changed and the entry 20a-20n for the excluded channel 22 remains the same.

The channel data communication module 32 generates a channel exclusion announcement 40 based on the exclusion data 38 stored in the exclusion list datastore 34. The channel data communication module 32 retrieves the exclusion list 18 from the exclusion list datastore 34 and evaluates each entry 20a-20n in the exclusion list 18. For example, for each entry 20a-20n in the exclusion list 18, the channel data communication module 32 evaluates the count 26, and the hold count 28. If the excluded channel 22 is a static entry, the entry 20a-20n containing the excluded channel 22 remains in the exclusion list 18. If, however, the excluded channel 22 is not a static entry, the count 26 and the hold count 28 are decremented until they each reach zero. Thereafter, the entry 20a-20n containing the excluded channel 22 is removed from the exclusion list 18. Once each entry 22a-22n in the exclusion list 18 has been evaluated, the channel data communication module 32 inserts the remaining excluded channel data 38 from the exclusion list 18 into the channel exclusion announcement 40. The channel data communication module 32 then generates signals to transmit the channel exclusion announcement 40, for example, as part of the beacon.

After exchanging the channel exclusion announcements 36a-36n and 40, each mesh point 12a-12n has an exclusion list 18 with the same or similar entries 20a-20n. Each mesh point 12a-12n can then determine a communication channel or a subset of communication channels based on the exclusion list 18.

Figure 3:
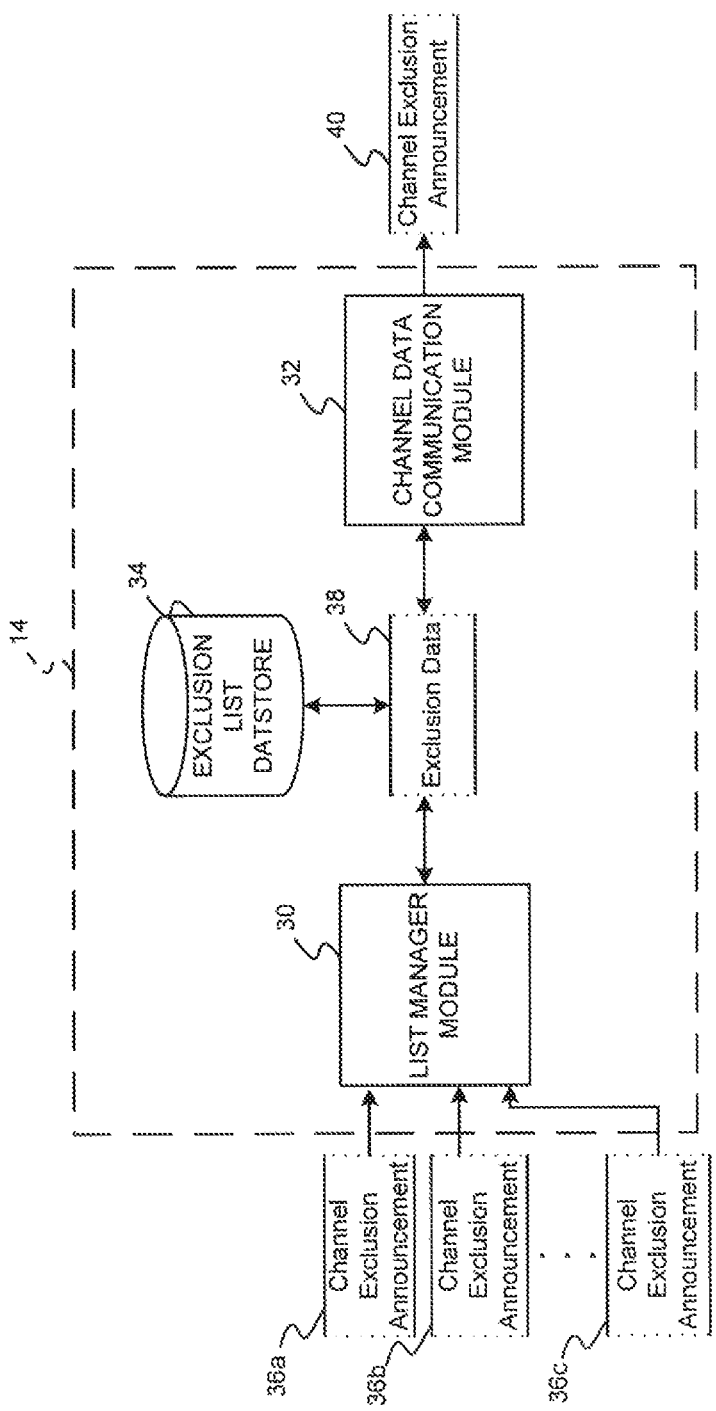
FIG. 3 is a dataflow diagram illustrating a channel manager module of the wireless communication system in accordance with exemplary embodiments.
Figure 4:
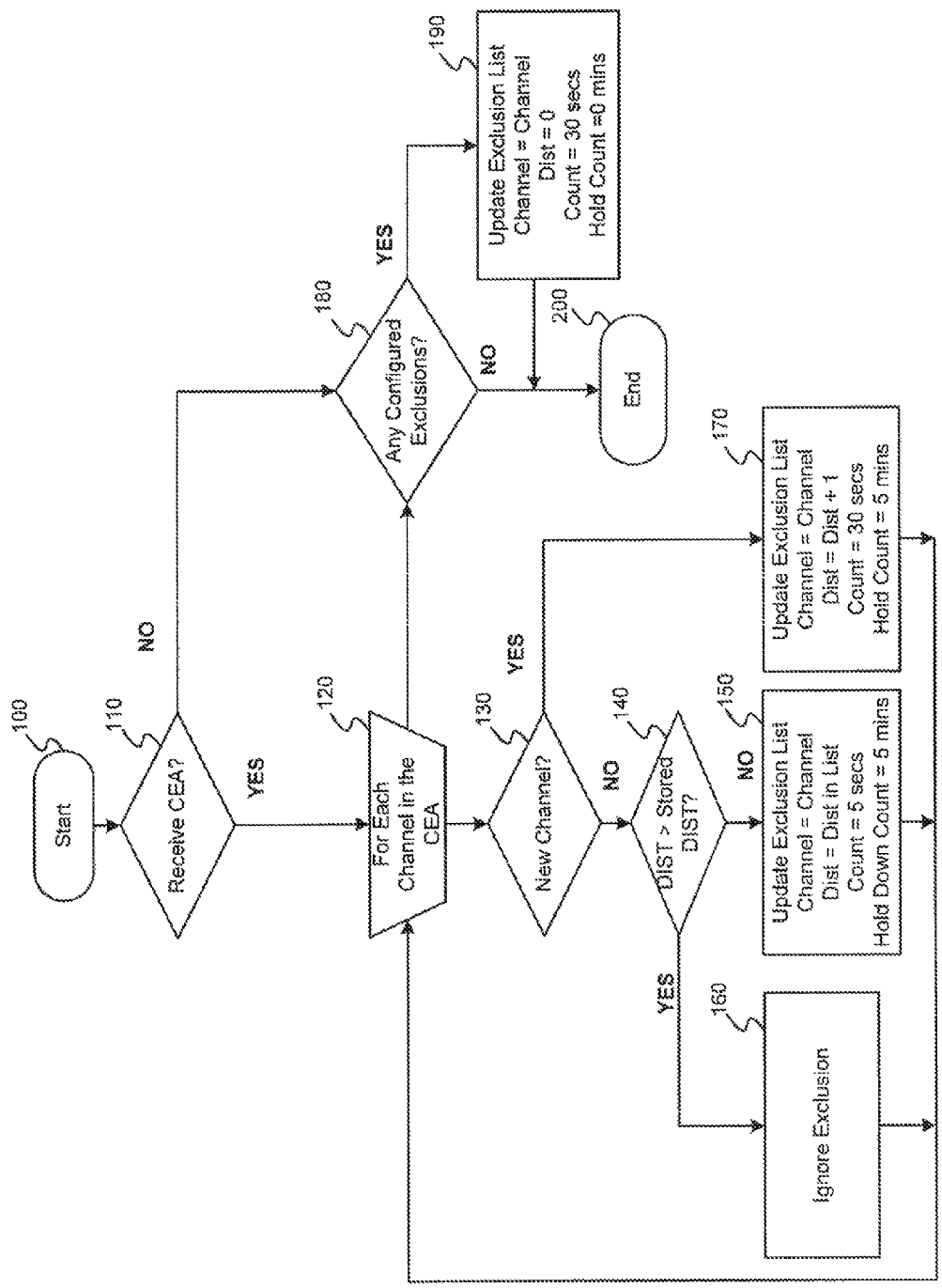
FIG. 4 is a flowchart illustrating a channel management method that may be implemented by the channel manager module in accordance with exemplary embodiments.
Figure 5:
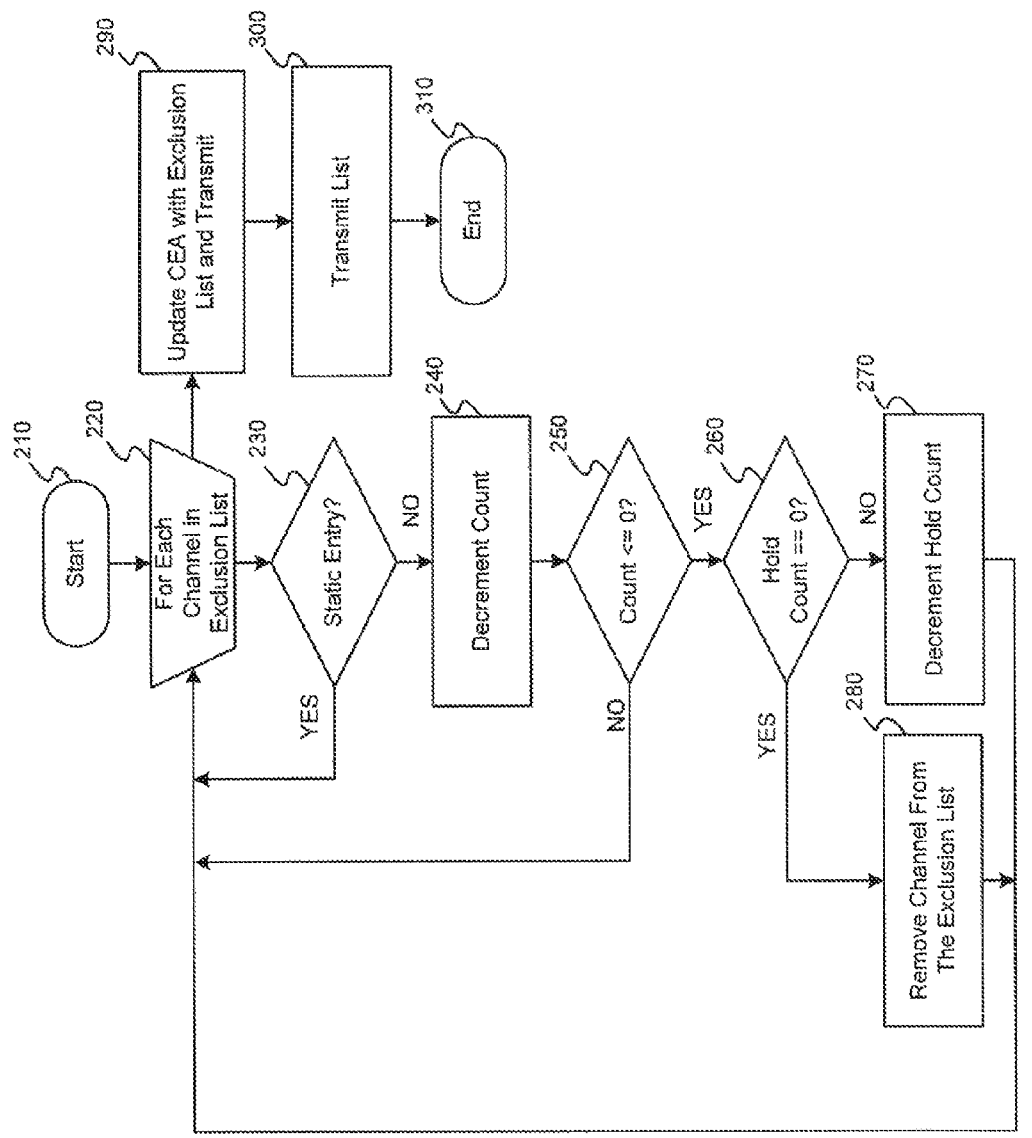
FIG. 5 is a flowchart illustrating a channel management method that may be implemented by the channel manager module in accordance with other exemplary embodiments.

Referring now to FIGS. 4 and 5, and with continued reference to FIGS. 1-3, flowcharts illustrate channel management methods that can be performed by the channel manager module 14 of FIGS. 1 and 3 in accordance with the present disclosure. As can be appreciated in light of the disclosure, the order of operation within the methods is not limited to the sequential execution as illustrated in FIGS. 4 and 5, but may be performed in one or more varying orders as applicable and in accordance with the present disclosure.

FIG. 4 illustrates a list management method that may be performed by the list manager module 30 in accordance with exemplary embodiments. The list manager method may be scheduled to run based on predetermined events, and/or can run continually at predetermined intervals during operation of the corresponding mesh point 12a-12n.

In one example, the method may begin at 100. It is determined whether a channel exclusion announcement 36a-36n is received at 110. If the channel exclusion announcement 36a-36n is received at 110, each channel in the channel exclusion announcement 36a-36n is evaluated at 120-170. For example, it is determined whether the channel is a new channel for exclusion at 130. If the channel is not a new channel for exclusion, rather the channel is already present in the exclusion list 18 at 130, the distance associated with the channel is evaluated at 140. If the distance is greater than the stored distance 24 for the channel at 140, the exclusion list 18 is updated at 150 by setting the excluded channel 22 equal to the channel, setting the distance 24 equal to the distance in the exclusion list 18, setting the count 26 equal to five seconds or other time, and setting the hold count 28 to five minutes or other time. If, however, the distance is less than the stored distance 24 for that channel at 140, the channel is ignored at 160.

If, at 130, the channel exclusion announcement 36a-36n includes a new channel, the exclusion list 18 is updated at 170 by setting the excluded channel 22 to the new channel, setting the distance 24 to the distance in the channel exclusion announcement 36a-36n plus one, setting the count 26 to thirty seconds or other time, and setting the hold count 28 to five minutes or other time.

If, at 110, there are no received channel exclusion announcements 36a-36n, or once each channel in the channel exclusion announcement 36a-36n is evaluated at 120, it is determined whether there are any configured exclusions at 180. If there are configured exclusions at 180, the exclusion list 18 is updated by setting the excluded channel 22 to the configured exclusion, by setting the distance 24 equal to zero, and by setting the count 26 to thirty seconds or other time, and setting the hold count 28 to zero. Thereafter the method may end at 200.

FIG. 5 illustrates a channel data communication method that may be performed by the channel data communication module 32 in accordance with exemplary embodiments. The channel data communication method may be scheduled to run based on predetermined events, and/or can run continually at predetermined intervals during operation of the corresponding mesh point.

In one example, the method may begin at 210. The exclusion list 18 is processed at 220-280. For example, each entry 20a-20n in the exclusion list 18 is extracted from the exclusion list 18 at 220 and evaluated at 230. If the entry 20a-20n is a static entry, that is, a channel that was configured at the mesh point 12a-12n, the method continues by extracting the next entry 20a-20n from the exclusion list 18 at 220.

If, however, the entry 20a-20n is not a static entry at 230, rather the entry is an entry that has been added from another mesh point 12a-12n, the corresponding count 26 is decremented at 240 and evaluated at 250. If, at 250, the count 26 is greater than zero, the method continues by extracting the next entry 20a-20n from the exclusion list 18 at 220. If, however, the count 26 is less than or equal to zero at 250, the hold count 28 is evaluated at 260.

If, at 260, the hold count 28 is not equal to zero, the hold count 28 is decremented at 270. If, however, the hold count 28 is equal to zero, the entry 20a-20n is removed from the exclusion list 18 at 280. Thereafter, the method continues with extracting the next entry 20a-20n from the exclusion list 18 at 220.

Once the processing of the exclusion list 18 is complete at 220, the channel exclusion announcement 40 is updated based on the exclusion list 18 at 290. The updated channel exclusion announcement 40 is transmitted at 300; and the method may end at 310.

As can be appreciated, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A method of managing channel selection among a plurality of mesh points in a wireless network, comprising:
   receiving a first announcement that includes channel exclusion information from a first mesh point;
   managing an entry in a channel exclusion list of channels to be excluded based on the announcement, the entry including a respective field for a determined distance from an originator of the entry, a first timer, and a second timer; and
   generating a second announcement to the first mesh point based on the channel exclusion list.

2. The method of claim 1 wherein the channel exclusion list includes a plurality of entries, and wherein the managing comprises at least one of adding and removing the entry to the plurality of entries in the channel exclusion list.

3. The method of claim 2 wherein the distance is a distance from an originating mesh point.

4. The method of claim 2 wherein the first timer is a timer associated with an age of the entry and wherein the second timer is a hold timer.

5. The method of claim 2 wherein each entry of the plurality of entries includes a plurality of fields, and wherein the managing comprises updating a field of the plurality of fields, and wherein the plurality of fields includes a distance field, a first timer field, and a second timer field.

6. The method of claim 1 wherein the channel exclusion information indicates at least one channel that is unsuitable for communication in the wireless network.

7. The method of claim 1 further comprising determining a channel to be excluded and adding an entry in the channel exclusion list based on the channel to be excluded.

8. The method of claim 7 wherein the determining is based on a detection of interference on the channel to be excluded.

9. The method of claim 7 wherein the determining is based on configuration of a static channel to be excluded.

10. A system for managing channel selection in a wireless network, comprising:

a datastore that stores a channel exclusion list of channels to be excluded, wherein the channel exclusion list has a plurality of entries, wherein each entry of the plurality of entries includes a plurality of fields; and a channel manager module that selectively updates at least one field of at least one entry of the plurality of entries of the channel exclusion list based on a channel exclusion announcement the entry including a respective field for a determined distance from an originator of the entry, a first timer, and a second timer.

11. The system of claim 10 wherein each entry of the plurality of entries corresponds to an excluded channel of the wireless network.

12. The system of claim 10 wherein one of the plurality of fields is a timer field that stores the first timer for holding the entry in the exclusion list for a predetermined time based on an entry type.

13. The system of claim 10 wherein one of the plurality of fields is a timer field that stores the second timer for holding the entry in the exclusion list for a predetermined time.

14. The system of claim 10 wherein one of the plurality of fields is a distance field that stores the distance from a mesh point.

15. The system of claim 10 wherein the channel manager module resides on a first mesh point and wherein the channel manager module receives the channel exclusion announcement from a second mesh point.

16. The system of claim 10 wherein the channel manager module generates a second channel exclusion announcement based on the exclusion list.

17. The system of claim 16 wherein the second channel exclusion announcement is generated as part of a beacon.

18. The system of claim 10 wherein the channel exclusion announcement includes an excluded channel and a distance.

19. A computer program product for managing channel selection among a plurality of mesh points in a wireless network, comprising:

a non-transitory tangible storage medium readable by a processing circuit and storing instructions for execution by the processing circuit for performing a method comprising:

receiving a first announcement that includes channel exclusion information from a first mesh point;

managing an entry in a channel exclusion list of channels to be excluded based on the announcement the entry including a respective field for a determined distance from an originator of the entry, a first timer, and a second timer; and generating a second announcement to the first mesh point based on the channel exclusion list.

* * * * *